(12) United States Patent
Wang

(10) Patent No.: US 6,476,165 B1
(45) Date of Patent: Nov. 5, 2002

(54) OLEFIN POLYMERIZATION PROCESS USING FATTY AMINE ADDITIVES AND BORON-MODIFIED SUPPORTED CATALYST

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/521,166

(22) Filed: Mar. 8, 2000

(51) Int. Cl.[7] .............................. C08F 4/02; C08F 4/44; C08F 4/643

(52) U.S. Cl. .................. 526/129; 526/74; 526/124.9; 526/134; 526/141; 526/147; 526/161; 526/172; 526/156; 526/904

(58) Field of Search ................ 526/74, 124.9, 526/129, 134, 141, 147, 161, 172, 156, 904

(56) References Cited

U.S. PATENT DOCUMENTS

| | | | |
|---|---|---|---|
| 4,508,843 A | 4/1985 | Etherton et al. | 502/115 |
| 4,530,913 A | 7/1985 | Pullukat et al. | 502/104 |
| 4,565,795 A | 1/1986 | Short et al. | 502/110 |
| 4,808,561 A | 2/1989 | Welborn, Jr. | 502/104 |
| 5,539,124 A | 7/1996 | Etherton et al. | 548/402 |
| 5,554,775 A | 9/1996 | Krishnamurti et al. | 556/7 |
| 5,637,660 A | 6/1997 | Nagy et al. | 526/160 |
| 5,801,113 A | 9/1998 | Jajelowo et al. | 502/104 |
| 5,902,866 A | 5/1999 | Nagy et al. | 526/133 |
| 6,201,076 B1 * | 3/2001 | Etherton | 526/74 |

FOREIGN PATENT DOCUMENTS

| | | |
|---|---|---|
| EP | 0811638 A2 | 12/1997 |
| WO | WO 96/11961 | 4/1996 |
| WO | WO 96/11960 | 5/1996 |
| WO | WO 99/24446 | 5/1999 |

* cited by examiner

Primary Examiner—David W. Wu
Assistant Examiner—R. Rabago
(74) Attorney, Agent, or Firm—Kevin M. Carroll

(57) ABSTRACT

An olefin polymerization process is described. The process comprises polymerizing an olefin in the presence of a support, a single-site catalyst, an optional activator, and a fatty amine. The support is chemically treated with an organoboron compound. The single-site catalyst contains a polymerization-stable, heteroatomic ligand. The fatty amine is added directly to the reactor. The combination of pre-treating the support with an organoboron compound and the addition of fatty amine to the process unexpectedly increases catalyst activity.

18 Claims, No Drawings

OLEFIN POLYMERIZATION PROCESS USING FATTY AMINE ADDITIVES AND BORON-MODIFIED SUPPORTED CATALYST

FIELD OF THE INVENTION

This invention relates to a process for polymerizing olefins in the presence of a supported single-site catalyst, an optional activator, and a fatty amine additive. The support is treated with an effective amount of an organoboron compound. The combination of an organoboron treated support and fatty amine surprisingly increases the activity of the catalyst.

BACKGROUND OF THE INVENTION

Many olefin polymerization catalysts are known, including conventional Ziegler-Natta catalysts. To improve polymer properties, highly active single-site catalysts, in particular metallocenes, are beginning to replace Ziegler-Natta catalysts. Although more expensive, the new catalysts give polymers with narrow molecular weight distributions and good comonomer incorporation, which allows easier production of low-density polymers.

Recent attention has focused on developing improved single-site catalysts that contain a heteroatomic ring ligand. In particular, U.S. Pat. No. 5,554,775 discloses single-site catalysts containing a boraaryl moiety such as boranaphthalene or boraphenanthrene. U.S. Pat. No. 5,539,124 discloses catalysts containing a pyrrolyl ring, i.e., an "azametallocene." Further, U.S. Pat. No. 5,637,660 discloses catalysts in which a cyclopentadienyl moiety of a metallocene is replaced by a readily available quinolinyl or pyridinyl ligand. U.S. Pat. No. 5,902,866 discloses azaborolinyl heterometallocenes wherein at least one aromatic ring includes both a boron atom and a nitrogen atom. Additionally, PCT Intl. Appl. No. 99/24446 discloses catalysts containing an indenoindolyl ligand which contains both indene and indole units within the same ring system.

Single-site catalysts are typically soluble in the polymerization reaction medium and are therefore valuable for solution processes. However, for gas-phase, slurry, and bulk monomer processes, it is useful to immobilize the catalyst on a carrier or support in order to control polymer morphology. One disadvantage is that the supported catalysts typically give decreased activity compared to unsupported catalysts. Another disadvantage is that supported catalysts tend to cause reactor fouling and/or sheeting. Reactor fouling results in many serious problems including poor heat transfer, poor particle morphology, and forced reactor shutdown.

To solve these problems, a number of process and catalyst modifications have been disclosed. Copending appl. Ser. No. 09/318,008, filed May 25, 1999, now U.S. Pat. No. 6,211,311, discloses pre-treating the support with a chemical modifier to improve heterometallocene catalyst activity and shelf-life. For supporting Ziegler-Natta catalysts, support modifications with organomagnesiums, organosilanes, and organoboranes are disclosed in U.S. Pat. Nos. 4,508,843, 4,530,913, and 4,565,795. Metallocene catalyst support modification with organosilanes and aluminum, zinc, or silicon compounds is taught in U.S. Pat. Nos. 4,808,561 and 5,801,113.

Methods to reduce reactor fouling have also been disclosed. Copending appl. Ser. No. 09/301,802, filed Apr. 29, 1999, now U.S. Pat. No. 6,201,076, discloses the use of fatty amine additives to reduce reactor fouling in olefin polymerization with supported heterometallocenes. For olefin polymerization using metallocenes, EP 811,638 teaches the addition of an antistatic agent to the polymerization reactor to reduce static buildup that can lead to fouling or sheeting. PCT Intl. Appl. Nos. WO 96/11960 and WO 96/11961 disclose catalyst systems formed by combining a metallocene, an activator, and an amine surface modifier applied to a support. Both references teach that the surface modifier must be added to the support during catalyst preparation in order to reduce reactor fouling.

In sum, new olefin polymerization processes that would prevent reactor fouling and increase catalyst activity with supported single-site catalysts are needed. Particularly valuable processes would use readily available additives that can be fed directly to the reactor.

SUMMARY OF THE INVENTION

The invention is a polymerization process. The process comprises polymerizing an olefin in the presence of a support, a single-site catalyst, an optional activator, and a fatty amine. The support is chemically treated with an organoboron compound. The single-site catalyst contains a polymerization-stable, heteroatomic ligand. The fatty amine is added directly to the polymerization reactor.

We surprisingly found that the addition of fatty amine, when added directly to the reactor, in combination with organoboron modification of the support increases catalyst activity compared to comparable runs without the addition of fatty amine.

DETAILED DESCRIPTION OF THE INVENTION

The process of the invention comprises polymerizing an olefin in the presence of a support that has been chemically treated with an organoboron compound, a single-site catalyst, optionally an activator, and a fatty amine. The single-site catalyst contains a polymerization-stable, heteroatomic ligand. The fatty amine is added directly to the polymerization reactor.

Single-site catalysts useful in the invention contain at least one anionic, polymerization-stable, heteroatomic ligand. Suitable heteroatomic ligands include substituted or unsubstituted boraaryl, pyrrolyl, quinolinyl, pyridinyl, and azaborolinyl groups as described in U.S. Pat. Nos. 5,554,775, 5,539,124, 5,637,660, and 5,902,866 the teachings of which are also incorporated herein by reference. Substituted or unsubstituted indenoindolyl ligands, such as those described in PCT Intl. Appl. No. 99/24446 can also be used. The polymerization-stable ligands may also include cyclopentadienyl (substituted or unsubstituted) anions such as those described in U.S. Pat. Nos. 4,791,180 and 4,752,597, the teachings of which are incorporated herein by reference.

The polymerization-stable anionic ligands can be bridged. Groups that can be used to bridge the polymerization-stable anionic ligands include, for example, methylene, ethylene, 1,2-phenylene, and dialkyl silyls. Normally, only a single bridge is used in the single-site catalyst. Bridging the ligand changes the geometry around the transition metal and can improve catalyst activity and other properties, such as comonomer incorporation and thermal stability.

The single-site catalyst includes a transition or lanthanide metal. Preferably, the metal is from Groups 3 to 10 of the Periodic Table. More preferred catalysts include a Group 4 to 6 transition metal; most preferably, the catalyst contains a Group 4 metal such as titanium or zirconium.

The single-site catalyst usually includes at least one other ligand. Preferably, the other ligand is hydride, halide, $C_1$–$C_{20}$ alkoxy, siloxy, hydrocarbyl, or dialkylamido. More preferably, the ligand is hydride, chloride, bromide, $C_1$–$C_8$ alkoxy, $C_3$–$C_{18}$ trialkylsiloxy, methyl, phenyl, benzyl, neopentyl, or $C_2$–$C_6$ dialkylamido. Particularly preferred are hydrocarbyl groups that do not undergo β-hydrogen elimination reactions (e.g., olefin formation with loss of M-H); examples of preferred hydrocarbyl groups are methyl, phenyl, benzyl, neopentyl, and the like.

An activator is preferably used to convert the metal complex to a cationically active species. Suitable activators include alumoxanes. Preferred alumoxanes are polymeric aluminum compounds represented by the cyclic formula $(R^1—Al—O)_s$ or the linear formula $R^1(R^1—Al—O)_sAlR^1$ wherein $R^1$ is a $C_1$–$C_5$ alkyl group and s is an integer from 1 to about 20. Preferably, $R^1$ is methyl and s is from about 4 to about 10. Exemplary alumoxane activators are (poly) methylalumoxane (MAO), ethylalumoxane, and diisobutylalumoxane. Optionally, the activator is a trialkyl or triaryl aluminum compound, which preferably has the formula $AlR^2_3$ where $R^2$ denotes a $C_1$–$C_{20}$ hydrocarbyl.

Suitable activators also include neutral boron and aluminum compounds, including substituted or unsubstituted trialkyl or triaryl boron or aluminum derivatives, such as tris(perfluorophenyl)boron, and ionic borates such as tri(n-butyl)ammonium tetrakis(pentafluorophenyl) boron or trityl tetrakis(pentafluorophenyl) boron. The ionic borates ionize the neutral organometallic compound to produce an active catalyst for olefin polymerization. See, for instance, U.S. Pat. Nos. 5,153,157, 5,198,401, and 5,241,025, all of which are incorporated herein by reference.

The molar ratio of the metal of the activator component to the transition metal of the single-site catalyst is preferably in the range of about 0.3:1 to 1000:1, more preferably from about 20:1 to 800:1, and most preferably from about 50:1 to 500:1. Where the activator is an ionic borate, the molar ratio of the metal of the activator component to the transition metal of the single-site catalyst is preferably in the range of about 0.3:1 to 3:1.

The single-site catalyst is immobilized on a support, which is preferably a porous material. The support can be inorganic oxides, inorganic chlorides, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred supports include silica, alumina, silica-aluminas, magnesias, titania, zirconia, magnesium chloride, and polystyrene.

Preferably, the support is silylated prior to use. Silylation is used to remove acidic sites from the support surface. Silylation is performed by reacting the support with a silylating agent, either in solution by incipient wetness or impregnation, or in the vapor phase. Preferred silylating agents include alkylsilyl halides, alkyldisilazanes, alkyl and aryl alkoxysilanes. Preferred alkylsilyl halides include trialkylsilyl halides, dialkylsilyl dihalides, and alkylsilyl trihalides, which preferably have the formula $R^3R^4R^5SiX$, $R^3R^4SiX_2$ or $R^3SiX_3$. Particularly preferred alkylsilyl halides are trimethylchlorosilane, dimethyldichlorosilane, t-butyldimethylchlorosilane, and trimethylsilyl iodide.

Suitable alkyl disilazanes include hexaalkyl disilazanes having the formula $R^3_3SiNHSiR^3_3$. In particular, hexamethyldisilazane is preferred.

Preferred alkyl or aryl alkoxysilanes include trialkyl alkoxysilanes, dialkyl dialkoxysilanes, and alkyl trialkoxysilanes, which preferably have the formula $R^3R^4R^5Si(OR^6)$, $R^3R^4Si(OR^5)(OR^6)$ or $R^3Si(OR^4)(OR^5)(OR^6)$ where $R^3$, $R^4$, $R^5$, and $R^6$ denote the same or different $C_1$–$C_{20}$ hydrocarbyl. Exemplary alkyl alkoxysilanes are cyclohexylmethyldimethoxysilane, methyltrimethoxysilane, methyltriethoxysilane, phenyltriethoxysilane, and dicyclopentyldimethoxysilane.

Preferably, the support has a surface area in the range of about 10 to about 700 m$^2$/g, more preferably from about 50 to about 500 m$^2$/g, and most preferably from about 100 to about 400 m$^2$/g. Preferably, the pore volume of the support is in the range of about 0.1 to about 4.0 mL/g, more preferably from about 0.5 to about 3.5 mL/g, and most preferably from about 0.8 to about 3.0 mL/g. Preferably, the average particle size of the support is in the range of about 10 to about 500 μm, more preferably from about 20 to about 200 μm, and most preferably from about 10 to about 100 μm. The average pore diameter is typically in the range of about 10 to about 1000 Å, preferably about 20 to about 500 Å, and most preferably about 50 to about 350 Å.

The single-site catalysts are supported using any of a variety of immobilization techniques. In one method, the single-site catalyst is dissolved in a solvent and combined with the support. Evaporation of the solvent gives a supported catalyst. An incipient wetness method can also be used. The activator can also be deposited on the support or it can be introduced into the reactor separately from the catalyst.

Before the support is combined with the single-site catalyst, it is chemically modified by treatment with an organoboron compound. Preferred organoboron compounds include trialkylborons, triarylborons, and trialkoxyborons having the formula $R^3R^4R^5B$ or $B(OR^3)(OR^4)(OR^5)$. Most preferred are trimethylboron, triethylboron, tripropylboron, triisobutylboron, trimethoxyboron, triethoxyboron, tripropoxyboron, and triphenoxyboron.

The organoboron compound is added to the support in an amount preferably in the range of about 0.1 to 10 mmoles of boron per gram of support, more preferably from about 0.2 to 5 mmoles/gram, and most preferably from about 0.5 to 3 mmoles/gram. Treatment with the organoboron compound may be performed in either the liquid phase or in the vapor phase. In the liquid phase, the organoboron compound is applied to the support as a liquid, either by itself or as a solution in a suitable solvent such as a hydrocarbon. In the vapor phase, the organoboron compound is contacted with the support in the form of a gas or by injecting liquid modifier into the preheated support to vaporize the modifier. Treatment temperatures are preferably in the range of from about 20° C. to about 400° C. The organoboron treatment step can be carried out in a batch, semi-continuous, or continuous manner.

The support is preferably heated at a temperature from about 50° C. to about 1000° C., more preferably from about 100° C. to about 800° C., either before or after the organoboron modification. In another method, the support heat treatment and organoboron modification occur simultaneously as the organoboron compound in the vapor phase is passed over a heated support as discussed above.

A fatty amine is used in the process of the invention. By "fatty amine," we mean an amine that contains one or more long-chain hydrocarbyl groups, which can be further substituted with other functional groups such as ether or hydroxyl groups. Preferred fatty amines have the formula $R^7R^8R^9N$ in which at least one of $R^7$, $R^8$, or $R^9$ is a $C_8$ or greater hydrocarbyl, and is preferably a $C_8$–$C_{30}$ hydrocarbyl. Suitable fatty amines include primary, secondary, tertiary, and ethoxylated or propoxylated amines. Examples include oleylamine, 1-dodecylamine, di-n-octadecylamine, tri(isodecyl)amine, dimethyl-n-decylamine, bis(2-hydroxyethyl)dodecylamine, and bis(2-hydroxypropyl)dodecylamine. Particularly preferred fatty amines are Armostat® 310, product of Akzo Nobel Chemicals, Inc., which is a bis(2-hydroxyethyl)tallowamine and Armostat® 710, product of Akzo Nobel Chemicals, Inc., which is a bis(2-hydroxyethyl)oleylamine.

The fatty amine is used in an amount within the range of about 5 to about 100 weight percent, preferably from about 5 to about 75 weight percent, and most preferably about 35 to about 75 weight percent, based on the amount of the supported single-site catalyst. More than 100 weight percent is uneconomical and can deactivate the supported single-site catalyst.

The supported single-site catalyst and activator are added to the polymerization reactor separately from the fatty amine. Preferably, the single-site catalyst and activator are combined first to form a solution of their reaction product, which is then combined with the support material, evaporated, washed, and dried.

The process of the invention is used to polymerize olefins, preferably α-olefins. Suitable olefins include, for example, ethylene, propylene, 1-butene, 1-hexene, 1-octene, and the like, and mixtures thereof. The catalyst is valuable for copolymerizing ethylene with α-olefins or di-olefins (e.g., 1,3-butadiene, 1,4-hexadiene, 1,5-hexadiene).

Processes of the invention include gas phase, slurry, and bulk monomer processes. Gas and slurry phase processes are preferred.

In the slurry process, particulate polymer is formed in a liquid reaction medium to which a-olefins and often hydrogen are added, along with catalyst. The fatty amine is fed to the reactor separately from the catalyst. A slurry process involves pressures in the range of about 1 to about 500 atmospheres and temperatures in the range of about –60° C. to about 100° C. The reaction medium employed should be liquid under the conditions of polymerization and relatively inert. Preferably, it is an alkane, a cycloalkane, or an aromatic hydrocarbon such as toluene, ethylbenzene, or xylene. More preferably, hexane or isobutane is employed.

The following examples merely illustrate the invention. Those skilled in the art will recognize many variations that are within the spirit of the invention and scope of the claims.

EXAMPLE 1

PREPARATION OF CATALYST SUPPORTED ON TRIETHYLBORON-TREATED SILICA

Neat hexamethyidisilazane (HMDS), in an amount equivalent to 12.5 weight percent of the silica, is slowly added to stirring Davison 948 silica and is mixed for 2 hours. The HMDS-treated silica is then dried at 150° C. for 6 hours in a fluidized bed dryer with dry nitrogen gas flow. At room temperature, neat triethylboron (TEB, Aldrich, 95+%), in an amount equivalent to 24.5 weight percent of the silica, is slowly added to a heptane slurry of HMDS-treated silica prepared above (3.5 mL heptane/g silica). The slurry is then refluxed in an oil bath at 100° C. for 6 hours. After cooling to room temperature, the liquid is removed by vacuum and the solid is dried.

A solution of cyclopentadienyl(1-methylboratabenzene)zirconium dichloride (0.0405 g, 0.127 mmol) and trityl tetrakis(pentafluorophenyl)borate (0.1426 g, 0.154 mmol) in toluene (6 mL) is added to the TEB-modified silica (2.026 g). The suspension is stirred for 40 min. The slurry is then vacuum dried for 3 hours to give Catalyst 1. Catalyst loading is 0.53 wt. % Zr and 0.20 wt. % B.

COMPARATIVE EXAMPLE 2

PREPARATION OF CATALYST WITHOUT ORAGANOBORON-TREATMENT

Neat hexamethyidisilazane (HMDS), in an amount equivalent to 12.5 weight percent of the silica, is slowly added to stirring Davison 948 silica and mixed for 2 hours. The HMDS-treated silica is then dried at 600° C. for 6 hours in a fluidized bed dryer with dry nitrogen gas flow. A solution of cyclopentadienyl(1-methylboratabenzene)zirconium dichloride (0.0147 g, 0.046 mmol) and trityl tetrakis(pentafluorophenyl)borate (0.0518 g, 0.056 mmol) in toluene (2.5 mL) is added to the HMDS-treated silica (0.70 g) at room temperature. The suspension is stirred for 40 min. The slurry is then vacuum dried for 2 h to give Comparative Catalyst 2. Catalyst loading is 0.55 wt. % Zr.

EXAMPLE 3

POLYMERIZATION OF ETHYLENE WITH CATALYSTS 1 AND 2 IN THE PRESENCE OF FATTY AMINE ADDITIVE

Polymerizations are performed in a one-liter, stainless-steel autoclave. The specified quantity of fatty amine (Armostat® 710), if any, is charged to the reactor. TIBAL (0.75 mmol; 0.75 mL of 1.0 M solution in heptane) is added to the reactor with isobutane (about 350 mL). No hydrogen or comonomers are added. Ethylene is added to the reactor (to 500 psig total pressure), and the temperature is allowed to equilibrate to 75° C. The specified amount of supported catalyst is then injected with isobutane (about 50 mL) under nitrogen pressure, and the polymerization is conducted for about 0.5 h. The polymer is collected by venting solvent in the reactor, then is dried in a vacuum oven, and weighed. Activity is measured in grams of polymer produced/g catalyst/h. See Table 1 for the specified amounts of catalyst and fatty amine for the polymerization runs. See Table 3 for results.

The examples show that the combination of organoboron treatment of the support and the addition of a fatty amine to the reaction mixture significantly increases catalyst activity in ethylene polymerization.

EXAMPLE 4

COPOLYMERIZATION OF ETHYLENE AND 1-HEXENE WITH CATALYSTS 1 AND 2 IN THE PRESENCE OF FATTY AMINE ADDITIVE

Polymerizations are performed in a one-liter, stainless-steel autoclave. The specified quantity of fatty amine (Armostat® 710), if any, is charged to the reactor. 1-Hexene (40 mL) is added to the reactor. TIBAL (0.38 mmol; 0.38 mL of 1.0 M solution in heptane) is added to the reactor with isobutane (about 350 mL). Ethylene is added to the reactor (to 500 psig total pressure), and the temperature is allowed to equilibrate to 70° C. The specified amount of supported catalyst is then injected with isobutane (about 50 mL) under nitrogen pressure, and the polymerization is conducted for about 1.0 h. The polymer is collected by venting solvent in the reactor, then is dried in a vacuum oven, and weighed.

Activity is measured in grams of polymer produced/g catalyst/h. See Table 2 for the specified amounts of catalyst and fatty amine for the polymerization runs and Table 4 for results.

The examples show that the combination of organoboron treatment of the support and the addition of a fatty amine to the reaction mixture significantly increases catalyst activity in ethylene copolymerization.

TABLE 1

Amounts of Catalyst and Fatty Amine used in Polymerization of Ethylene

| Run # | Catalyst | Catalyst Amount (mg) | Fatty Amine Amount (mg) | Fatty Amine/Catalyst (%) |
|---|---|---|---|---|
| 3A | 1 | 41 | 4 | 9.8 |
| *3B | 1 | 42 | 0 | 0 |
| *3C | 2 | 48 | 4 | 8.3 |
| *3D | 2 | 45 | 0 | 0 |

*Comparative Example.

TABLE 2

Amounts of Catalyst and Fatty Amine used in Copolymerization of Ethylene and 1-Hexene

| Run # | Catalyst | Catalyst Amount (mg) | Fatty Amine Amount (mg) | Fatty Amine/Catalyst (%) |
|---|---|---|---|---|
| 4A | 1 | 19 | 4 | 21.0 |
| *4B | 1 | 22 | 0 | 0 |
| *4C | 2 | 23 | 4 | 17.4 |
| *4D | 2 | 24 | 0 | 0 |

*Comparative Example.

TABLE 3

Effect of Organoboron Pretreatment and Fatty Amine Additive in Polymerization of Ethylene

| Run # | Catalyst | Boron Treatment | Fatty Amine Additive | Activity (g polymer/ g cat/h) |
|---|---|---|---|---|
| 3A | 1 | Yes | Yes | 4661 |
| *3B | 1 | Yes | — | 2393 |
| *3C | 2 | — | Yes | 930 |
| *3D | 2 | — | — | 863 |

*Comparative Example.

TABLE 4

Effect of Organoboron Pretreatment and Fatty Amine Additive in Copolymerization of Ethylene and Hexene

| Run # | Catalyst | Boron Treatment | Fatty Amine Additive | Activity (g polymer/ g cat/h) |
|---|---|---|---|---|
| 4A | 1 | Yes | Yes | 6763 |
| *4B | 1 | Yes | — | 3930 |
| *4C | 2 | — | Yes | 4247 |
| *4D | 2 | — | — | 1734 |

*Comparative Example.

I claim:

1. A process which comprises polymerizing an olefin in the presence of:

(a) a silylated support chemically treated with an effective amount of an organoboron compound;

(b) a single-site catalyst comprising a Group 3–10 transition or lanthanide metal, M, and at least one polymerization-stable heteroatomic ligand;

(c) an optional activator; and (d) a fatty amine;

wherein the fatty amine is added directly to the polymerization reactor.

2. The process of claim 1 wherein the support is heated at a temperature within the range of about 50° C. to about 1000° C. before, during, or after the organoboron treatment.

3. The process of claim 1 wherein the support is selected from the group consisting of silicas, aluminas, silica-aluminas, titanias, zirconias, magnesias, magnesium chloride, polystyrene, and mixtures thereof.

4. The process of claim 1 wherein the heteroatomic ligand is selected from the group consisting of substituted or unsubstituted boraaryl, pyridinyl, quinolinyl, azaborolinyl, pyrrolyl, indenoindolyl, and mixtures thereof.

5. The process of claim 1 wherein M is a Group 4–6 transition metal.

6. The process of claim 1 wherein M is a Group 4 transition metal.

7. The process of claim 1 wherein the activator is selected from the group consisting of alumoxanes, neutral aluminum compounds, neutral boron compounds, ionic borates, and ionic aluminates.

8. The process of claim 1 wherein the fatty amine contains at least one $C_8$ to $C_{30}$ hydrocarbyl.

9. The process of claim 1 wherein the fatty amine is used in an amount from about 5 to about 75 weight percent, based on the amount of supported catalyst.

10. The process of claim 1 wherein the olefin is ethylene or a mixture of ethylene and an α-olefin.

11. A process which comprises polymerizing ethylene or a mixture of ethylene and an α-olefin in the presence of:

(a) a silylated support chemically treated with an effective amount of an organoboron compound;

(b) a single-site catalyst comprising a Group 4–6 transition metal, M, and at least one boraaryl ligand;

(c) an optional activator; and (d) a fatty amine containing at least one $C_8$ or greater hydrocarbyl;

wherein the fatty amine is added directly to the polymerization reactor.

12. The process of claim 11 wherein the support is heated at a temperature within the range of about 50° C. to about 1000° C. before, during, or after the organoboron treatment.

13. The process of claim 11 wherein the support is selected from the group consisting of silicas, aluminas, silica-aluminas, titanias, zirconias, magnesias, magnesium chloride, polystyrene, and mixtures thereof.

14. The process of claim 11 wherein the activator is selected from the group consisting of alumoxanes, neutral aluminum compounds, neutral boron compounds, ionic borates, and ionic aluminates.

15. The process of claim 11 wherein the fatty amine is used in an amount from about 5 to about 75 weight percent, based on the amount of supported catalyst.

16. A process which comprises polymerizing ethylene or a mixture of ethylene and an α-olefin in the presence of:

(a) a silylated silica chemically treated with an effective amount of an organoboron compound;
(b) a single-site catalyst comprising a Group 4 transition metal, M, and at least one boraaryl ligand;
(c) an optional activator; and
(d) from about 5 to about 75 weight %, based on the amount of supported catalyst, of a fatty amine;
wherein the fatty amine is added directly to the polymerization reactor.

17. The process of claim 16 wherein the silica is heated at a temperature within the range of about 50° C. to about 1000° C. before, during, or after the organoboron treatment.

18. The process of claim 16 wherein the activator is selected from the group consisting of alumoxanes, neutral aluminum compounds, neutral boron compounds, ionic borates, and ionic aluminates.

* * * * *